United States Patent [19]
Lysen

[11] Patent Number: 5,408,878
[45] Date of Patent: Apr. 25, 1995

[54] DEVICE FOR MEASURING OF ACCELERATION BY PIEZO-ELECTRIC TRANSDUCERS

[75] Inventor: Heinrich Lysen, Munich, Germany

[73] Assignee: Pruftechnik Dieter Busch AG, Germany

[21] Appl. No.: 793,439

[22] PCT Filed: Apr. 12, 1991

[86] PCT No.: PCT/EP91/00709
§ 371 Date: Dec. 9, 1991
§ 102(e) Date: Dec. 9, 1991

[87] PCT Pub. No.: WO91/16636
PCT Pub. Date: Oct. 31, 1991

[30] Foreign Application Priority Data
Apr. 12, 1990 [DE] Germany ............ 40 11 910.6

[51] Int. Cl.⁶ .................. G01P 15/09; H01L 41/113
[52] U.S. Cl. .................... 73/517 R; 310/329
[58] Field of Search ............ 73/517 AV, 35 P, 493, 73/497, 517 R; 310/329

[56] References Cited
U.S. PATENT DOCUMENTS
4,447,755  5/1984  Ghiurea .................... 310/329
5,063,782  11/1991  Kellett ...................... 73/654

Primary Examiner—Hezron E. Williams
Assistant Examiner—Michael J. Brock
Attorney, Agent, or Firm—Kirkpatrick & Lockhart

[57] ABSTRACT

A device for the measurement of acceleration by piezo-electric transducers. The device comprises a carrier 14 and 16 with a principal axis parallel to the direction of acceleration measurement, a seismic mass 20 and 22 retained to be movable relative to the carrier and piezo-electric elements 12 and 12' coupled therewith for excitation and co-operating in pairs, wherein the arrangement is such that pyro-electric effects compensate for each other. According to the invention, the carrier has a transverse member 16 which extends transversely to the principal axis and the piezo-electric elements acted on by compression excitation are installed on sides thereof, which are opposite with respect to the direction of the principal axis, between this and the seismic mass 20 and 22. There is thus achieved, apart from the temperature independence, a large insensitivity to base expansion as well as to any accelerations of kind and direction other than linear and parallel to the principal axis.

13 Claims, 1 Drawing Sheet

DEVICE FOR MEASURING OF ACCELERATION BY PIEZO-ELECTRIC TRANSDUCERS

The invention relates to a device for measurement of the acceleration of a test body by means of piezo-electric transducers.

BACKGROUND OF THE INVENTION

Devices of this kind are known from EP-A1-0316498 and DE-A1-3038660.

The device according to EP-A1-03136498 comprises a solid cylindrical body which serves as a carrier and at the same time as a mounting base and which has mutually parallel end faces; through which a pin is passed co-axially to the axis of the cylinder and perpendicularly to the end faces so that it projects perpendicularly out of one end face of the carrier. At a distance from the carrier, the pin passes co-axially through a cylindrical seismic mass which similarly comprises end faces perpendicular to the axis of the cylinder. A piezo-electric transducer, which likewise co-axially surrounds the pin, is clamped between the carrier and the seismic mass by means of the pin, which acts as a tightening pin. The pin is slender and resilient and has appreciable play in the transducer. Bending stresses, which in the transducer cause an increase in pressure on one side of the pin and a decrease in pressure on the other, occur under mass inertia forces which load the seismic mass transversely to the axis of the pin. The transducer is provided with divided electrodes which are arranged and connected in correspondence with the pressure stresses arising in push-pull, so that the changes in charge in the electrodes arranged in push-pull are added to provide bending stresses, and the pyro-electric effects caused by heat flow between the carrier and the seismic mass through the transducer compensate for each other.

Devices for the measurement of acceleration should preferably be sensitive to only certain types of acceleration, e.g.: translational or angular, and the axis of acceleration, the acceleration, angular acceleration) and axis of acceleration, the principal axis. However, this is not adequately so in the known device. The known device is a so-called transverse acceleration pick-up, which should respond only to accelerations perpendicular to the axis of the pin. However, because of the need for freedom of tilting of the seismic mass, angular accelerations and linear, accelerations perpendicular to the principal axis have such a strong influence on the measurement that undesired side effects result and in spite of compensation for pyro-electric effects the device is not usable as an accurate accelerometer, but serves virtually only as a sensor.

The known device according to DE-A1 30 38 660 comprises a carrier as well as a seismic mass, which consists of one piece and is so connected with the carrier that it is pivotable relative to the carrier about an elongate bending line. The centre of gravity of the seismic mass and the bending line determine a plane. Arranged at the seismic mass perpendicularly to this plane as well as parallel to the bending line is a piezo-electric platelet which is firmly connected at its ends remote from the plane with the piezo-electric mass and, in the centre therebetween and at the level of the plane, with the carrier. The platelet is polarised in opposite directions parallel to the plane, as well as perpendicularly to its wide sides, which are disposed above and below the central fastening region and parallel to the bending bearing, and is covered by separate electrodes. A third electrode extends on the other side of the platelet and between the fastening regions at the ends. The platelet is compressed on one side of the plane and extended on the other side, thus stressed in shear, by accelerations acting perpendicularly to the plane. The electrodes are so connected together that the piezo-electric effects are added, and these piezoelectric effects are compensated by the pyro-electric effects, which are brought about by heat flow from the fastening point at the carrier through the platelet to the fastening places at the seismic mass.

The transverse compression excitation ($k_{31}$), which is present in the afore-mentioned known device, has the disadvantage of a very low mechanical rigidity. The piezo-platelet can break easily and is not clamped over a large area. It is intended that the known device shall measure accelerations perpendicularly to the afore-mentioned plane, but it actually functions as an angle pick-up about the axis of the bending bearing and is thus also sensitive to accelerations transversely to the intended measurement axis to an appreciable degree.

Moreover, a piezo-electric acceleration pick-up with compression excitation and comprising a cylindrical carrier arranged on a base for fastening to the test piece, a seismic mass plugged axially on the carrier and a disc-shaped piezo-electric element disposed under a mechanical bias, is known from DE-OS 30 29 847. The piezo-electric disc excited by compression in direction of the acceleration to be measured is disposed under bias by an arrangement of a rivet, an elastic element and a seismic mass arranged at the axial end of the carrier. This known acceleration pick-up is sensitive to the influence of external temperature. The piezo-electrical element is disposed—apart from electrodes and insulating elements therebetween—directly on the base, so that a heat flow through the piezo-electric element is present in the case of a temperature difference between the base and the seismic mass. The heat flow causes a charge separation, thus a pyro-electric effect at the piezo-electric element similarly to the case of compression or shear. The sign and extent of the pyro-electric effect depend on the polarisation of the piezo-electric element concerned, thus on whether the heat flow takes place in or against the direction of the potarisation. Temperature gradients and heat flow between the base and the seismic mass are virtually unavoidable in many measurements and falsify the measurement results in the known device due to the appreciable pyro-electrically caused charge displacements at the piezo-electric element. The connection of the piezo-electric element directly with the base is also disadvantageous to the extent that a deformation of the base, as for example can arise due to mechanical stressing or due to temperature deformation, acts directly on the piezo-electric element itself influencing its piezo-electric effect, so that the known acceleration pick-up also has a low insensitivity to expansion of the base. This applies also to the known device according to EP-A1-03 16 498 discussed above. However, acceleration pick-ups should have a high base expansion insensitivity.

A further known piezo-electric acceleration sensor explained in DE-OS 30 19 551 comprises a carrier which stands on a base and which, for improvement of temperature constancy, has substantially the same thermal coefficient of expansion as the piezo-electric elements subjected to shear excitation thereat. Although acceleration sensors of that kind have little sensitivity to temperature differences, they have, however, only a low mechanical rigidity, just as the above-described known acceleration pick-up according to DE-A1 30 38 660. Seismic masses by their nature develop large inertia forces and shear forces in acceleration pick-ups with shear excitation and therefore damage their fastening to the carrier or damage the carrier itself. Acceleration pick-ups with shear excitation are also unsuitable for measurement of high-frequency oscillations, since the carrier arrangement and seismic masses coupled thereto easily get into resonance or develop natural oscillations.

SUMMARY OF THE INVENTION

The invention is based on the formation of a device for measurement of the acceleration of a test piece by means of piezo-electric transducers in which the device comprises a carrier rigidly connectible with the test piece and having a principal axis extending in a direction parallel to the direction of the acceleration to be measured. The device apart from temperature insensitivity also has a high mechanical rigidity and a very appreciable insensitivity to base expansion, i.e. to expansion of the mounting base to be fastened to the test piece, and in particular also to accelerations of any kind and direction other than those which are linear and parallel to the principal axis of the carrier, so that it is usable as a measuring device of high measurement accuracy for measurement of longitudinal accelerations.

The advantages of the device according to the invention by comparison with the afore-described state of the art reside in a temperature-neutral behaviour, since the stresses and charge displacements, which occur due to heat flow at the piezo-electric elements, mutually cancel. Voltage or charge displacements due to temperature are balanced out by the arrangement of the piezo-electric elements in pairs on the upper side and the underside of the transverse member of the carrier, so that only piezo-electric measurement values caused by acceleration remain. Secondly, moreover, the provided arrangement of the piezo-electric elements in compression excitation has a much greater mechanical rigidity and strength than an arrangement in shear excitation, since shear forces do not arise at the carrier or at the fastening of the piezo-electric elements to the carrier and the piezo-electric elements are not exposed to the risk of breakage. Thirdly, the piezo-electric transducer also behaves neutrally relative to mechanical or temperature-induced deformation of the base for the carrier, since the piezo-electric elements are connected not with the base, but at a spacing from this and with the carrier. The carrier with its transverse member can be constructed very robustly without problems. As in the case of pyro-electric effects, piezo-electric interference effects emanating from accelerations of kind and direction other than the acceleration which is to be measured and which here is the linear acceleration parallel to the principal axis of the carrier, compensate for each other or such disturbing effects do not even come into being.

In a preferred embodiment of the device, the mass parts coupled to the two piezo-electric elements of a pair have substantially the same thermal capacity and/or the same specific thermal capacity and/or the same thermal conductivity.

Preferably, the seismic mass parts coupled to the two piezo-electric elements of a pair are connected with each other in thermally and/or electrically conductive manner. If the seismic mass parts are not only mechanically connected with the piezo-electric elements, but also electrically conductively connected, the pyro-electric effects occuring when there is heat flow through the piezo-electric elements compensate for each other by way of the electrically conducting parts of the mass, i.e. they are "short-circuited". The compensation of the pyro-electric effect at the piezo-electric element can, however, also take place with the aid of a suitable electrical connection of the piezo-electric elements or an electronic circuit.

The seismic mass parts coupled to the piezo-electric elements of a pair can be combined into an integral body or form two or more individual bodies. In that case, seismic individual masses which are connected in thermally conductive manner with the piezo-electric elements as well as with each other are preferred, so that no temperature differences are present between the parts of the seismic mass. The seismic masses therefore advantageously consist of thermally highly conductive material such as brass, silver, copper, gold, lead, aluminium, steel and so forth.

A temperature gradient generally exists between the base and the seismic mass in accelerometers, since the base surface cannot be adequately thermally insulated relative to the frequently very hot test piece. In such a case, a heat flow takes place from the base by way of the carrier equipment through the piezo-electric elements to the seismic mass. It is therefore advantageous to so orient the polarisation of the two piezo-electric elements of the pair with respect to the carrier that the heat flow in the case of the piezo-electric elements takes place in the direction of polarisation and also against it. It is particularly advantageous if the pyro-electric effects at both the piezo-electric elements are of equal size so that they cancel each other completely through short-circuiting by way of the coupled seismic mass which conducts electrically and thermally.

The carrier for the piezo-electric elements is advantageously T-shaped or mushroom-shaped, wherein one of each pair of the two piezo-electric elements is arranged in each case on the upper side and the other on the underside of the transverse member formed thereby. The transverse member in this case is also oriented perpendicularly to the direction of acceleration, so that the individual piezo-electric elements or the polarisations thereof are also oriented similarly with respect to the direction of acceleration. The lower surface of the upper piezo-electric element is advantageously connected in electrically conductive manner by the transverse carrier with the upper surface of the lower piezo-electric element, so that piezo-electric effects occuring with an acceleration are summated.

The part of the carrier extending in the direction of the principal axis can have a foot widening towards the base and/or can be of conical shape. A carrier of a thermally poorly conducting material, such as ceramic material, is also favourable. If, on the other hand, the carrier at the same time is also to be an electrical conductor, VA-steel is to be preferred.

The arrangement of the T-shaped or mushroom-shaped carrier, the piezo-electric elements and the seismic mass in relation to each other can have substantially point symmetry and/or mirror symmetry. Disc-shaped piezo-electric elements, which consist of a piezo ceramic material, are al so preferred.

The device according to the invention can therefore comprise electrically insulating layers, in particular insulating discs, as well as electrodes for tapping-off the voltages or the charges between the carrier and the piezo-electric element and/or seismic mass and piezo-electric element.

Advantageously, the pyro-electric effects are short-circuited by way of the electrically conducting seismic mass directly at the piezo-electric elements of the pair, so that the completely cancel each other in favourable cases.

The opposed piezo-electric effects, which occur on acceleration by the seismic mass, are thereagainst preferably connected with each other by an electrically conductive carrier so that they are summated or reinforce each other. The voltage or charge difference, which is approximately doubled because of the arrangement according to the invention, in the piezo-electric effect can be tapped of directly by connecting tags at the elements and/or contacts at the electrically conductive seismic mass or electrically conductive parts connected therewith, and at the electrically conductive carrier or electrically conductive parts connected therewith.

The device according to the invention is also particularly suitable for measurement of oscillations. In that case it is particularly advantageous if the tapped-off voltage and charge values in the case of high-frequency oscillations between 10 and 50 kilohertz are filtered before electronic amplification so that the temperature dependence of the entire measuring device is balanced out. The device according to the invention shall be suitable for a temperature range from $-50°$ C. to $+150°$ C.

The device according to the invention is also especially suitable for the measurement of oscillations or of accelerations and shocks such as occur, for example, in the ground, at constructions above and below ground, at machines, in particular machines with rotating parts, in and at internal combustion engines, in propulsion means such as motor vehicles, aircraft, ships, rail bound vehicles, rockets and spacecraft, and so forth.

BRIEF DESCRIPTION OF THE DRAWING

The specific details of a preferred embodiment of the invention and their mode of functioning so as to enable those skilled in the art to practice the invention will be described in clear concise and exact terms in conjunction with the accompanying drawing, wherein.

DESCRIPTION OF PREFERRED EMBODIMENT

Figure 1:
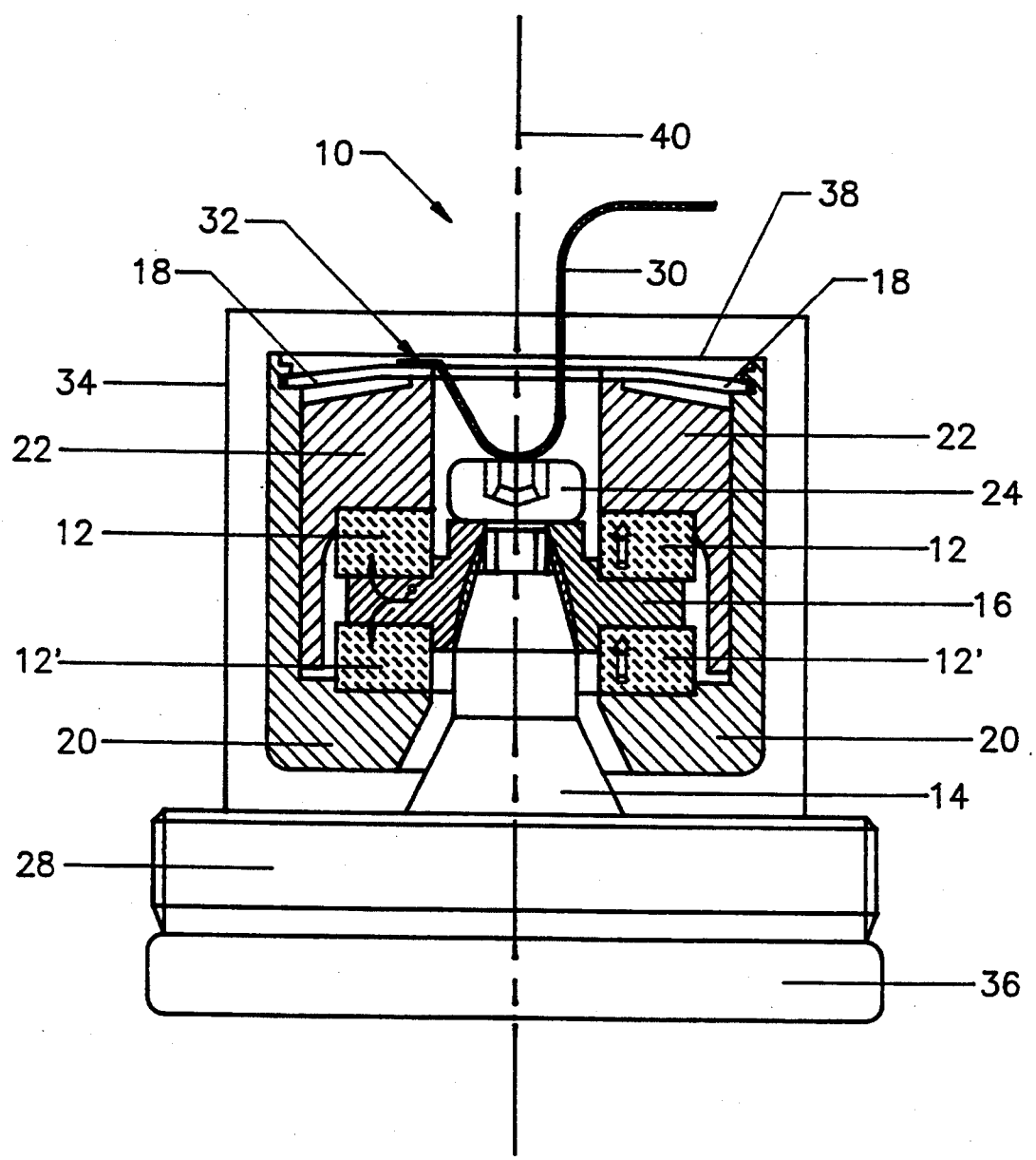
FIG. 1 is a schematic cross-sectional elevational view of a device for measuring acceleration utilizing piezo-electric transducers made in accordance with the invention.

An embodiment of the device according to the invention is explained more closely in the following by reference to the drawing.

The single figure of the drawing shows an axial section of a device according to the invention with a piezo-electric transducer.

The accelerometer 10 shown in the drawing possesses an overall cylindrical base 28. Disposed on this base 28 is a carrier arrangement 14 with a principal axis, illustrated in chain-dotted lines, which is perpendicular to the base 28, and simultaneously forms the centre line and axis of symmetry of the carrier arrangement and extends parallel to the direction of acceleration measurement, as well as with a disc-shaped direction of the acceleration being measured. A disc shaped transverse carrier or transverse member member 16 is positioned on base 28 oriented perpendicular to the direction of acceleration and measurement. Piezo-electric elements 12 and 12' are arranged respectively on the upper and lower surfaces of carrier 16 as seen in the drawing. The retaining surfaces provided for the piezo-electric elements on the upper side and the underside of the disc-shaped transverse carrier 16 are substantially perpendicular to the direction of the acceleration to be measured. The carrier 14 and transverse member 16 are formed of electrically conducting VA steel. The disc shaped piezo-electric elements 12 and 12' on the transverse member 16 piezo-electric elements 12 and 12' on or below the transverse member 16 are equally polarised with respect to the direction of acceleration measurements; the polarisaion of the piezo-electric elements is indicated in FIG. 1 by open arrows provided with signs. A possible heat flow Q (indicated by curved black arrows) from the carrier arrangement 14 and 16 through the piezo-electric elements 12 and 12' to the seismic mass or its parts 20 and 22 thus takes place in the direction of polarisation of the piezo-electric elements 12 and 12' and also against that direction. The upper surface of the piezo-electric element 12 and the lower surface of the piezo-electric element 12' are connected together in thermally and electrically conductive manner with parts 20 and 22 of the seismic mass, which have the same specific thermal capacity. The parts 20 and 22 of the seismic mass consist of a brass alloy. The mutually opposite pyro-electric effects at the upper piezo-electric element 12 and the lower piezo-electric element 12' therefore cancel each other. Thereagainst, voltages or charge displacements, which are oriented identically with respect to the carrier arrangement 14 and 16 and the parts 20 and 22 of the seismic mass, arise when an acceleration occurs in measuring direction. The surmounted transverse member 16 is firmly connected with the conically converging carrier part 14 perpendicular to the base 28 by way of a screw 24 at the cone. The disc-shaped piezo-electric elements 12 and 12' and the mass parts 20 and 22 are plugged onto the carrier arrangement and are held together with the aid of a plate spring 18. The afore-mentioned arrangement is protected against external influences by a cover 38 on the mass arrangement and a housing 34. The first electrical contact 32 for tapping-off of the piezo-electric effect is situated on the plate spring 18. The connecting line 30 to the contact 32 is guided outwardly by way of an opening in the cover 38 and the housing 34 after tension relief fastening at the screw 24. The second contact (not illustrated) is situated at the electrically conductive carrier arrangement 14 and 16 or at the base 28 connected therewith. A widened base 36 for fastening to the test piece is situated below the base 28.

I claim:
1. Device for the measurement of the acceleration of a test piece by means of piezo-electric transducer elements, said device comprising:
   a carrier which is rigidly connectible with the test piece and has a principal axis extending in a direction parallel to the direction of the acceleration to be measured, a seismic mass supported for movement relative to the carrier and piezo-electric elements which cooperate in pairs and are coupled for excitation with the carrier and portions of the seismic mass, an electrical connection of the piezo-electric elements with each other and with a signal output, wherein loading of the piezo-electric elements by the acceleration forces of the seismic mass and the polarity of the piezo-electric elements with respect to the seismic mass are so arranged that the pyro-electric effects which are caused by heat flow from the carrier through the piezo-electric elements to the seismic mass compensate for each other, and the piezo-electric effects caused by the acceleration to be measured reinforce each other, characterized in that the carrier comprises a transverse member extending transversely relative to the principal axis and that the piezo-electric elements of each cooperating pair are installed on opposite sides of the transverse member such that each said piezo-electric element is positioned between said transverse member and a corresponding portion of said seismic mass to provide said piezo-electric elements with opposite polarity with respect to said transverse member, said piezo-electric elements being arranged for compression excitation in directions that are substantially parallel to the principal axis.

2. Device according to claim 1, characterised in that the carrier is rigidly connected with a base (28, 30), comprising a contact surface, which is perpendicular to and surrounds the principal axis of the carrier, for placing against the test piece.

3. Device according to claim 1, characterised in that the carrier is T-shaped.

4. Device according to claim 1, wherein the portions of said seismic mass, which are coupled to the two piezo-electric elements of a pair, have substantially the same thermal capacity.

5. Device according to claim 4, wherein the portions of said seismic mass, which are coupled to the two piezo-electric elements of a pair, have the same specific thermal capacity and the same thermal conductivity.

6. Device according to claim 1, wherein the portions of said seismic mass, which are coupled to the two piezo-electric elements of a pair, are connected with each other in a thermally conductive manner.

7. Device according to claim 6 wherein said portions of said seismic mass which are coupled to the two piezo-electric elements of a pair, are connected to the piezo-electric elements and each other in an electrically conductive manner.

8. Device according to claim 1, wherein the portions of said seismic mass, which are coupled to the two piezo-electric elements of a pair, consist of individual parts.

9. Device according to claim 1, characterised in that the piezo-electric elements are disc-shaped.

10. Device according to claim 1, characterised in that the arrangement of the carrier, the piezo-electric elements and the seismic mass has substantially mirror symmetry.

11. Device according to claim 1, wherein the portions of said seismic mass, which are coupled to the two piezo-electric elements of a pair, have the same specific thermal capacity.

12. Device according to claim 1, wherein the portions of said seismic mass, which are coupled to the two piezo-electric elements of a pair, have the same thermal conductivity.

13. Device according to claim 1, wherein the portions of said seismic mass, which are coupled to the two piezo-electric elements of a pair, are connected with each other in an electrically conductive manner.

* * * * *